United States Patent
Sullivan

(10) Patent No.: US 8,176,219 B1
(45) Date of Patent: *May 8, 2012

(54) ROUTER HAVING ROUTING ENGINE SOFTWARE INSTANCE AND INTERAFACE CONTROLLER SOFTWARE INSTANCE ON A SINGLE PROCESSOR

(75) Inventor: John Sullivan, Groton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/088,991

(22) Filed: Apr. 18, 2011

Related U.S. Application Data

(63) Continuation of application No. 12/371,321, filed on Feb. 13, 2009, now Pat. No. 7,930,443, which is a continuation of application No. 11/259,454, filed on Oct. 26, 2005, now abandoned.

(51) Int. Cl.
*G06F 13/14* (2006.01)

(52) U.S. Cl. .......................... 710/20; 718/102

(58) Field of Classification Search ........................ None
See application file for complete search history.

(56) References Cited

U.S. PATENT DOCUMENTS

| | | | |
|---|---|---|---|
| 5,694,606 A | 12/1997 | Pletcher et al. | |
| 6,542,926 B2 | 4/2003 | Zalewski et al. | |
| 6,757,897 B1 | 6/2004 | Shi et al. | |
| 6,766,398 B2 | 7/2004 | Holm et al. | |
| 6,820,164 B2 | 11/2004 | Holm et al. | |
| 6,944,699 B1 | 9/2005 | Bugnion et al. | |
| 6,961,941 B1 | 11/2005 | Nelson et al. | |
| 7,093,024 B2 | 8/2006 | Craddock et al. | |
| 7,254,652 B2 | 8/2007 | Anderson et al. | |
| 7,263,091 B1 | 8/2007 | Woo et al. | |
| 7,310,314 B1 * | 12/2007 | Katz et al. ...................... 370/238 |
| 7,788,368 B1 | 8/2010 | Scano et al. | |
| 7,813,264 B2 | 10/2010 | Haq et al. | |
| 7,930,443 B1 * | 4/2011 | Sullivan ........................ 710/20 |
| 8,005,979 B2 * | 8/2011 | Dinker et al. ................. 709/238 |
| 2002/0052914 A1 | 5/2002 | Zalewski et al. | |
| 2003/0101440 A1 | 5/2003 | Hardin et al. | |
| 2004/0268347 A1 | 12/2004 | Knauerhase et al. | |
| 2005/0132367 A1 | 6/2005 | Tewari et al. | |
| 2005/0182853 A1 | 8/2005 | Lewites et al. | |
| 2005/0235123 A1 | 10/2005 | Zimmer et al. | |

(Continued)

OTHER PUBLICATIONS

Intel Architectural Software Developer's Manual vol. I, 1999, Intel Corp., 369 pp.

(Continued)

*Primary Examiner* — Cheng-Yuan Tseng
(74) *Attorney, Agent, or Firm* — Shumaker & Sieffert, P.A.

(57) ABSTRACT

A network device is described that concurrently executing more than one instance of an operating system on a single processor. Each of the instances of the operating system executes completely independent of the other instances. In this way, disparate instances may exist for the same operating system or for different operating systems. The techniques allow the processor to concurrently execute, for example, an instance of the operating system may emulate a routing engine and an instance of the operating system may emulate an interface controller. A hyper scheduler performs context switches between the operating systems to enable the processor to concurrently execute the instances of the operating system. The techniques may provide a low cost alternative to employing multiple processors within a network device, such as a router, to execute multiple independent operating systems.

15 Claims, 4 Drawing Sheets

U.S. PATENT DOCUMENTS

2005/0251806 A1 11/2005 Auslander et al.
2006/0143617 A1 6/2006 Knauerhase et al.
2006/0221832 A1 10/2006 Muller et al.

OTHER PUBLICATIONS

Intel Architectural Software Developer's Manual vol. II, 1999, Intel Corp., 854 pp.
Intel Architectural Software Developer's Manual vol. III, 1999, Intel Corp., 658 pp.
Tanenbaum, Modern Operating Systems, 2001, Prentice Hall, pp. 53-56, 132-135.
Dell, VMware ESX Server 2.1 Software for Dell PowerEdge Servers, Apr. 2004, pp. 1-30.
Dell, VMware ESX Server 2.1 Software Memory Sizing Guide for Dell PowerEdge Systems, Version 1.0, Jun. 2004, 17 pp.
White paper: "VMware Infrastructure, Resource Management with VMware DRS," VMware Best Practices, 2006, 24 pp. Note: The publication date of 2006 is sufficiently earlier than the effective U.S. filing date of Oct. 25, 2010, and any foreign priority date, of which there is none, so that the particular month of publication is not in issue.
Intel Architectural Software Developers Manual, accessed Apr. 12, 2007, 32 pp.
VMware, VCMI Sockets Programming Guide, VMware ESX/ESXi 4.x, VMware Workstation 7.x, VMware Server 2.0, last revised May 2010, 28 pp.
U.S. Appl. No. 11/259,454, by Sullivan, filed Oct. 26, 2005.
U.S. Appl. No. 12/911,337, by Kumar et al., filed Oct. 25, 2010.

* cited by examiner

ROUTER HAVING ROUTING ENGINE SOFTWARE INSTANCE AND INTERAFACE CONTROLLER SOFTWARE INSTANCE ON A SINGLE PROCESSOR

This application is a Continuation of U.S. application Ser. No. 12/371,321, filed Feb. 13, 2009, which is a continuation of application Ser. No. 11/259,454, filed Oct. 26, 2005, the entire contents of each of which are incorporated herein by reference.

TECHNICAL FIELD

The invention relates to network devices, and more particularly to network devices that execute multiple operating systems.

BACKGROUND

A computer network supports communication between various network devices that may comprise personal computers, laptops, workstations, personal digital assistants (PDAs), wireless devices, network-ready appliances, file servers, print servers, routers, or other devices. Certain devices within the network, such as routers, route communication across the network between the various devices. Typically, routers include a routing engine and an interface controller, where the routing engine maintains routing tables that detail paths through the network connecting these various devices, and the interface controller controls interface cards responsible for routing the information along these paths.

Generally, both the routing engine and interface controller utilize separate operating systems to handle exceptions and interrupts that may arise during the course of execution. In addition, conventional routers comprise separate processors to execute each of these operating systems. However, including multiple processors may substantially increase the total cost of the router, and converging the separate operating systems into a single operating system for execution within a single processor may be prohibitively complex.

Convergence issues may arise when separate operating systems maintain overlapping name spaces. For example, both the routing engine operating system and the interface controller operating system may define variables by the name "counter." The resulting name space overlap requires considerable time and effort to correct. Other convergence issues may include the use of disparate operating systems that may require different clock cycles to execute properly and different exception handling routines to properly handle exceptions. Converting operating systems requires significant effort to maintain the desired properties of the original operating systems.

SUMMARY

In general, the invention is directed to techniques for concurrently executing more than one instance of an operating system. More specifically, the techniques allow a single processor to execute multiple instances of the operating system. Each of the instances of the operating system executes completely independent of the other instances. In this way, disparate instances may exist within the same operating system. The techniques may provide a low cost alternative to employing multiple processors within a network device, such as a router, to execute multiple independent operating systems.

For example, a network device, such as a router, may concurrently execute two or more instances of an operating system to manage the functions of a routing engine and an interface controller using a single processor. A hyper scheduler may facilitate concurrent execution of the instances by enabling the processor to perform context switches. The hyper scheduler may maintain a context switch routine that manages execution of each of the instances of the operating system, and the processor may execute the context switch routine to perform a context switch.

The processor performs the context switch by storing state information pertaining to one instance of the operating system and loading state information pertaining to another instance of the operating system. The state information may include register values the processor requires to correctly execute each instance of the operating system. Once the context switch is complete, the processor may begin executing the next instance of the operating system detailed in the context switch routine. In this manner, the router may employ a single processor to concurrently execute a first instance of an operating system to emulate a routine engine and execute a second instance of the operating system to emulate an interface controller.

In one embodiment, a method comprises storing multiple sets of exception handlers, wherein each set of exception handlers processes interrupts for a different instance of an operating system executing on a processor. The method further comprises performing a context switch between the exception handlers to enable the processor to concurrently execute a plurality of the instances of the operating system.

In another embodiment, a device comprises a processor that concurrently executes a plurality of instances of an operating system, and a hyper scheduler that performs a context switch to enable the processor to concurrently execute the plurality of instances of the operating system.

In another embodiment, the invention is directed to a computer-readable medium containing instructions. The instructions cause a programmable processor to store multiple sets of exception handlers, wherein each set of exception handlers processes interrupts for a different instance of an operating system executing on a processor, and perform a context switch between the exception handlers to enable the processor to concurrently execute a plurality of the instances of the operating system.

In another embodiment, a network device comprises a processor that concurrently executes a first operating system instance to emulate a routing engine and a second operating system instance to emulate an interface controller. The network device further comprises a hyper scheduler that performs a context switch to enable the processor to concurrently execute the first and second operating system instances.

In another embodiment, a method comprises maintaining pointers to a first exception handler and a second exception handler within a processor, wherein each of the exception handlers handles an interrupt for a different operating system instance. The method further comprises updating the pointers to switch between the first and second exception handlers in response to a context switch by the processor to execute the operating system instances concurrently.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
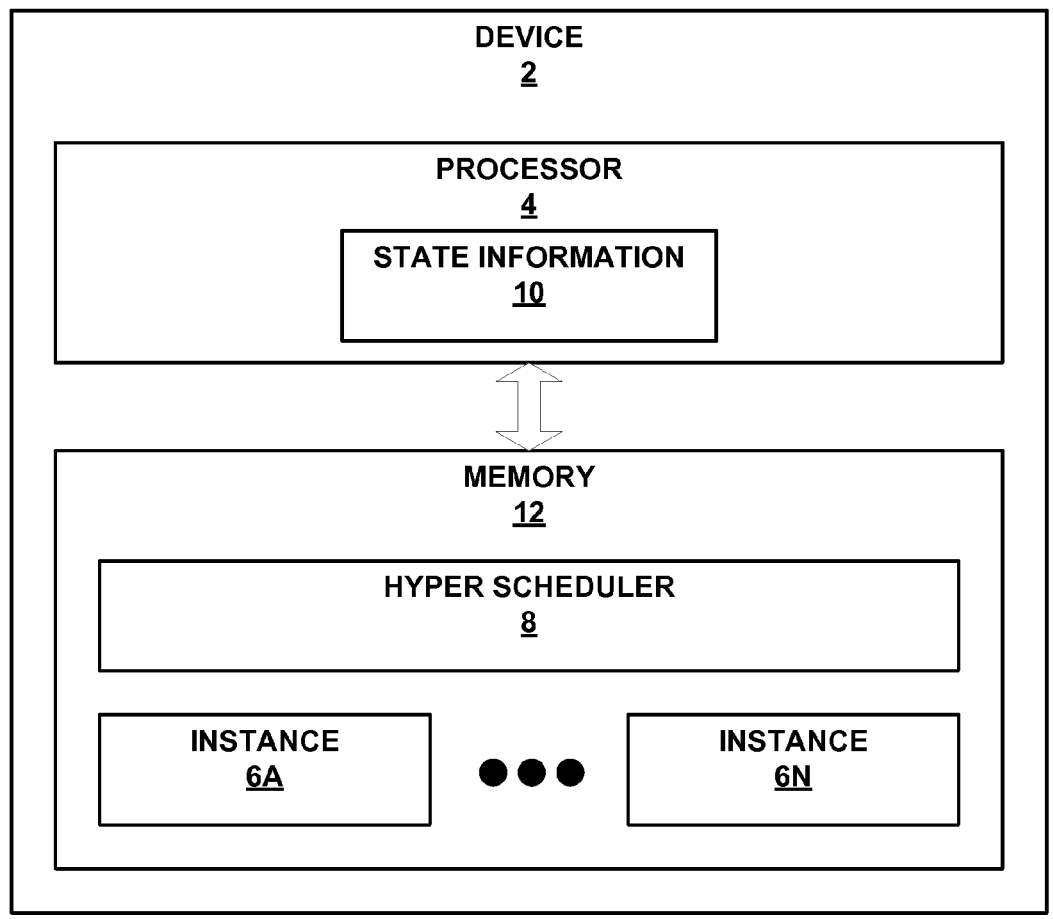
FIG. 1 is a block diagram illustrating a device comprising a processor that concurrently executes two or more instances of an operating system.

FIG. 1 is a block diagram illustrating a device 2 comprising a processor 4 that concurrently executes a plurality of instances 6A-6N ("instances 6") of an operating system. Device 2 further comprises a hyper scheduler 8 that switches the context associated with processor 4 to enable the concurrent execution of the instances 6 of the operating system. As illustrated in FIG. 1, processor 4 maintains state information 10 that pertains to one of the concurrently executed instances 6 of the operating system. Hyper scheduler 8 switches the context associated with processor 4 by loading information to and storing information from state information 10. State information 10 may comprise one or more registers, such as a general register, a timer register, a interrupt mask register, a program counter register, an interrupt vector prefix register (IVPR), and an interrupt vector offset register (IVOR). In the illustrated embodiment, device 2 comprises a memory 12 that includes instances 6 of the operating system and hyper scheduler 8.

In order to concurrently execute instances 6 of the operating system, processor 4 alternates execution of instances 6. Specifically, processor 4 may execute a first one of instances 6 for a set period of time, receive a timer interrupt, and execute a second one of instances 6 for a set period of time. Processor 4 executes the second one of the instances 6 by executing hyper scheduler 8 to switch the context of processor 4. Hyper scheduler 8 directs processor 4 to switch contexts by storing information that pertains to the first one of instances 6 from state information 10 to memory 12 and loading information pertaining to the second one of instances 6 from memory 12 to state information 10. The newly loaded state information 10 directs processor 4 to pertinent locations in memory 12 associated with the second one of instances 6. Processor 4 accesses these memory locations and executes the second one of instances 6. Upon receiving another timer interrupt, processor 4 may repeat this process to again execute the first one of instances 6. In other embodiments, processor 4 may execute a third one of instances 6 upon receiving another timer interrupt.

Typically, instances 6 have conflicting name spaces that prohibit quick convergence of instances 6 into a single instance of the operating system. Moreover, instances 6 may not facilitate quick convergence because instances 6 may include both a single task, run-to-completion instances, and a multitask, interrupt driven, fully preemptive instances.

Because each of instances 6 is distinct, conventional techniques mandate that a separate processor execute each of instances 6, which may greatly increase the cost of devices that execute two or more instances of an operating systems, such as device 2. Further, the time required to converge instances 6 into a single instance of an operating system may significantly delay production for devices operating disparate instances. Thus, device 2 may lower costs and reduce production time by enabling a single processor, such as processor 4, to concurrently execute two or more disparate instances of an operating system.

Figure 2:
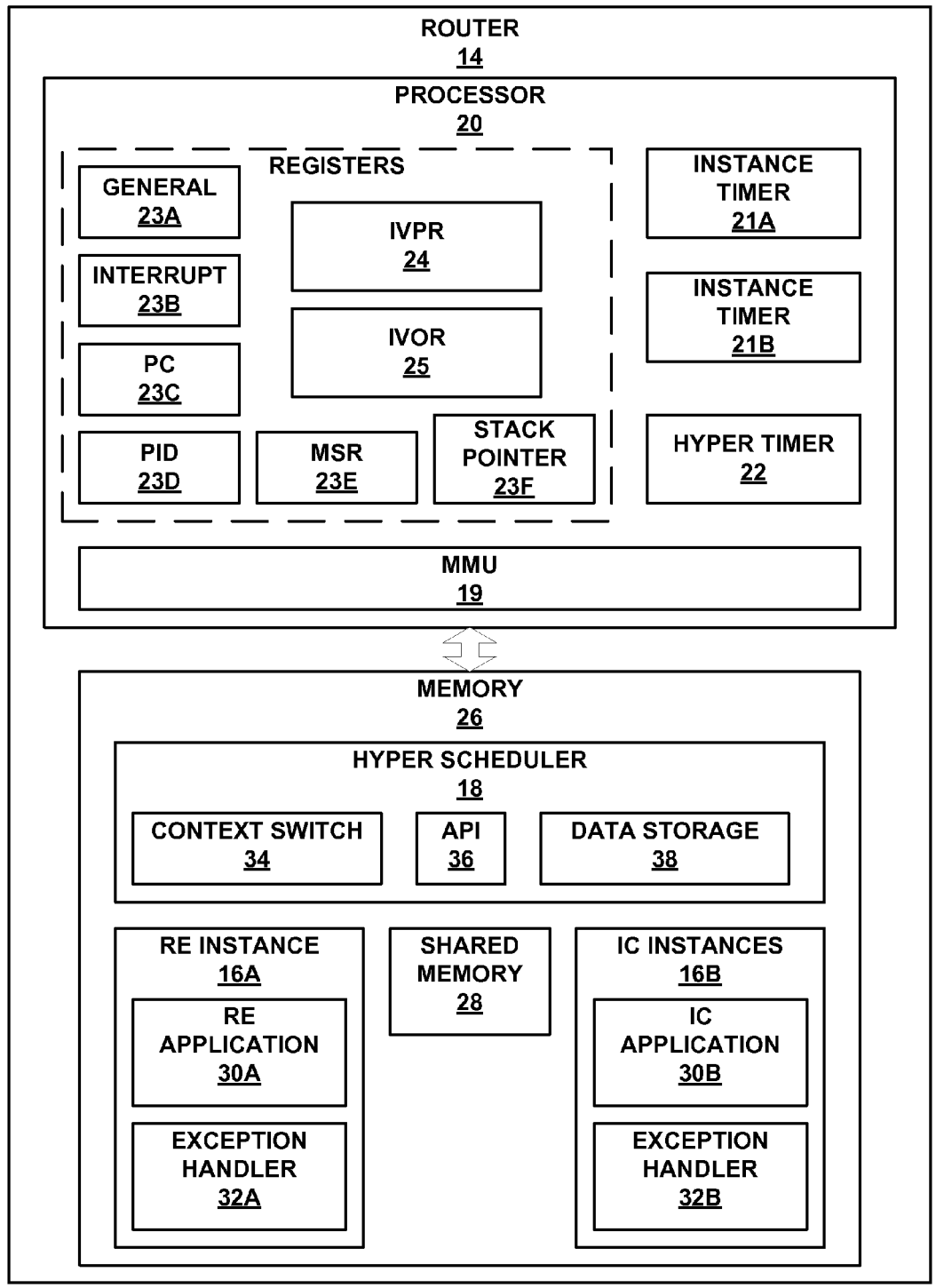
FIG. 2 is a block diagram illustrating an exemplary embodiment of a router that concurrently executes a plurality of instances of an operating system.

FIG. 2 is a block diagram illustrating an exemplary embodiment of a router 14 that concurrently executes two instances of an operating system. Router 14 may operate substantially similar to device 2 of FIG. 1. In the illustrated embodiment, router 14 concurrently executes a routing engine instance 16A ("RE instances 16A") and an interface controller instance 16B ("IC instance 16B") of the same operating system. In other embodiments, router 14 may concurrently execute a plurality of instances of an operating system.

Router 14 comprises a processor 20 and a hyper scheduler 18 that switches the context associated with processor 20, thereby enabling processor 20 to concurrently execute RE instance 16A and IC instance 16B. Processor 20 may comprise any processor that provides for assignment of exception and interrupt vectors to any address, such as the Book 'E' Power Personal Computer (PPC) 440. RE instance 16A and IC instance 16B may comprise instances of any type of operating system, such as a vxWorks, WINDOWS, LINUX, or MACINTOSH operating system. Router 14 also comprises a memory 26 that stores RE instance 16A, IC instance 16B, and hyper scheduler 18.

In the illustrated embodiment, processor 20 includes state information, substantially similar to state information 10 from FIG. 1, in the form of general register 23A, interrupt mask register 23B, program counter (PC) register 23C, process identification (PID) register 23D, machine state register (MSR) 23E, and stack pointer register 23F ("registers 23"). Processor 20 also includes interrupt vector prefix register (IVPR) 24, interrupt vector offset register (IVOR) 25, instance timer 21A that corresponds to RE instances 16A, instance timer 21B that corresponds to IC instances 16B, hyper timer 22, and memory management unit (MMU) 19.

General register 23A provides processor 20 with temporary storage that processor 20 may use during execution. Interrupt mask register 23B allows the processor to enable and disable interrupts to control which interrupts can occur during the course of execution. PC register 23C indicates the next instruction to execute. PID 23D store the process identification number of the process that processor 20 is currently executing. MSR register 23E is the main control register for processor 20. MSR register 23E controls the privilege level in which processor 20 is operating, whether interrupts are enabled or disabled, and whether data accesses can be translated through MMU 19. Stack pointer register 23F points to a location in a stack (not shown in FIG. 2) stored in memory 26.

IVPR 24 and IVOR 25 allow processor 20 to assign the exception and interrupt vectors to any address in a memory 26 rather than the limited choice of two location, e.g., high and low memory, afforded by other processors. Instance timer 21A comprises a clock cycle during which processor 20 steps through the processes executing in RE instance 16A. Instance timer 21B comprises a clock cycle during which processor 20 steps through the processes executing in IC instance 16B. Hyper timer 22 comprises a clock cycle utilized by hyper scheduler 18 during which processor 20 steps through RE instance 16A and IC instance 16B. MMU 19 aids processor 20 in protecting memory 26 by factoring the process identification number stored in PID register 23D into memory address translations, which may ensure that each process only accesses memory addresses assigned to that process.

Memory 26 may comprise a shared memory 28 that provides a memory space available for both RE instance 16A and IC instance 16B to use for communicating information between RE instance 16A and IC instance 16B. Other type of communications may be used between RE instance 16A and IC instance 16B, such as an Ethernet connection. RE instance 16A comprises RE application 30A and exception handler 32A, IC instance 16B comprises IC application 30B and exception handler 32B. Both RE application 30A and IC application 30B respectively carry out the functions necessary to implement a routing engine and interface controller of router 14. Exception handlers 32A, 32B provide respective RE instance 16A and IC instance 16B with the necessary procedures to handle exceptions and/or interrupts during execution of RE instance 16A and IC instance 16B. As illustrated in FIG. 2, both RE instance 16A and IC instance 16B comprise similar components; however, the invention should not be limited as such. In other embodiments, RE instance 16A may significantly differ from IC instance 16B.

Hyper scheduler 18 comprises a context switch application 34, an application programmer's interface 36 ("API 36"), and data storage 38. Context switch application 34 includes a context switch routine that manages the loading and storing of registers 23 for each of instances 16A, 16B during a context switch. Context switch application 34 may comprise instructions for causing a programmable processor, such as processor 20, to carry out the context switch routine. API 36 provides a software conduit that allows processes, such as RE instance 16A, to communicate with hyper scheduler 18, and further allows processor 20 to add and remove processes from the context switch routine. In other words, API 36 provides a series of functions, which are described in more detail below, that allow processor 20 and other processes to communicate with hyper scheduler 18. Data storage 38 provides hyper scheduler 18 with a dedicated memory space that hyper scheduler 18 may use to temporarily store information pertinent to a context switch, such as state information stored in registers 23.

In general, processor 20 may execute one of RE instances 16A or IC instances 16B ("instances 16"). During execution, processor 20 may receive one or more timer interrupts from instance timers 21A, 21B and hyper timer 22. Hyper timer 22 may indicate the clock cycle of processor 20, instance timer 21A may indicate a clock cycle for RE instance 16A, and instance timer 21B may indicate a clock cycle for IC instance 16B. Thus, processor 20 may execute each of instances 16 according to their own timer interrupts. In this way, substantially no alteration of instances 16 is necessary for processor 20 to correctly execute each of instances 16.

Upon receiving a timer interrupt from timer 22, processor 20 may count the timer interrupts corresponding to the clock cycle of processor 20, and, depending on the allocation of clock cycles for the loaded one of instances 16, processor 20 may initiate a context switch by executing hyper scheduler 18 from a storage medium, such as memory 26 or an instruction cache. In particular, processor 20 executes context switch application 34, which causes processor 20 to save registers 23 to data storage 38 for one of instances 16 of the operating system and load registers 23 from data storage 38 for the other one of instances 16 of the operating system. Processor 20 maintains pointers, e.g., IVPR 24 and IVOR 25, to exception handlers 32A and 32B of RE instance 16A and IC instance 16B, respectively. Processor 20 updates IVPR 24 and IVOR 25 to switch between exception handlers 32A, 32B in response to the context switch.

Once registers 23 are loaded and IVPR 24 and IVOR 25 are updated, processor 20 executes the one of instances 16 that processor 20 was not previously executing. Processor 20 may reset its counter and begin counting timer interrupts that correspond to the clock cycle of processor 20. Once the counter reaches a certain number, e.g., processor 20 receives another timer interrupt from timer 22, processor 20 executes hyper scheduler 18 to again perform a context switch, as described above.

In some embodiments, processor 20 may load hyper scheduler 18 while booting up, and, initialize hyper scheduler 18 via an initialization function of API 36. Once initialized, processor 20 may execute hyper scheduler 20 each time processor 20 receives a timer interrupt from timer 22. Also via API 36, processor 20 may indicate that hyper scheduler 18 manage one or more processes, such that processor 20 may concurrently execute the one or more processes. As described above, hyper scheduler 18 manages execution of these processes by causing processor 20 to perform a context switch according to context switch application 34. Hyper scheduler 18 may continue to manage its assigned processes until either processor 20 frees hyper scheduler 18 of all assigned processes or router 14 powers down.

In this manner, router 14 concurrently executes both of instances 16 by executing RE instance 16A until processor 20 receives a timer interrupt from instance timer 22, executing hyper scheduler 18 to switch contexts, executing IC instance 16B until processor 20 receives a timer interrupt from instance timer 22, and repeating this process indefinitely. Hyper scheduler 18 and, more specifically, context switch application 34, ensures that all of registers 23 are properly stored and loaded, such that processor 20 resumes execution of either of instances 16 where processor 20 left off prior to the context switch. In this way, router 14 may execute both of instances 16 on a single processor 20, thereby reducing the cost of router 14 by only requiring a single processor instead of separate processors for each of instances 16. Moreover, hyper scheduler 18 opaquely facilitates the execution of both of instances 16 by enabling router 14 to perform as if instances 16 were operating on separate processors.

Figure 3:
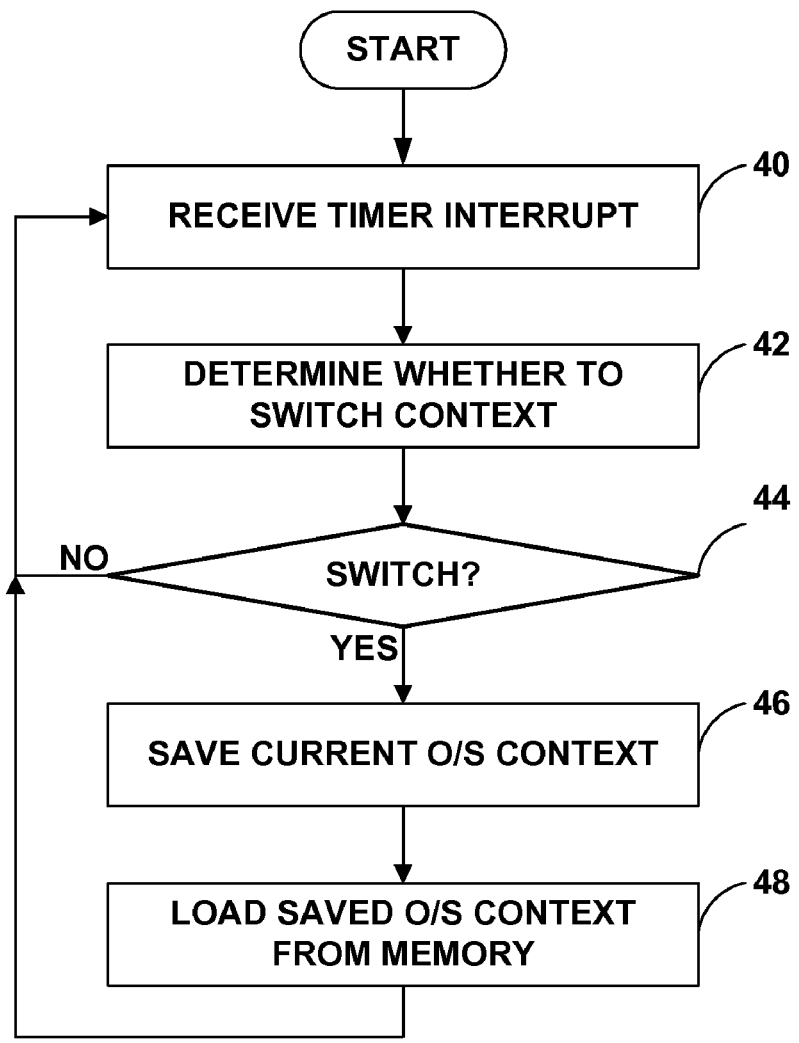
FIG. 3 is a flow chart illustrating an example process of concurrently executing one or more instances of an operating system in a single processor.

FIG. 3 is a flow chart illustrating an example operation of a device that concurrently executes one or more instances of an operating system. For purposes of illustration, the flowchart of FIG. 3 will be described in reference to FIG. 2, although the method may be implemented on different devices from that illustrated in FIG. 2.

Initially, processor 20 receives a timer interrupt from hyper timer 22 (40). In this manner, timer 22 dictates the speed at which processor 20 executes each of instances 16. Upon receiving the timer interrupt, processor 20 determines whether to switch contexts (42). Processor 20 determines whether to switch contexts by loading and executing hyper scheduler 18 from memory 26. Hyper scheduler 18 switches the context of processor 20 by first causing processor 20 to identify the process processor 20 is currently executing, e.g., read PID register 23D, and second causing processor 20 to determine whether an appropriate number of clock cycles have elapsed. The appropriate number of clock cycles may be pre-programmed prior to booting up router 14, or processor 20 may interact with hyper scheduler 18 via API 36 to set the number of clock cycles, thus setting the duration that processor 20 executes the process. Processor 20 may keep track of the clock cycles by decrementing a counter, and, once the counter reaches zero, processor 20 may determine that the appropriate number of clock cycles have elapsed.

If the appropriate number of clock cycles have not elapsed, e.g., the timer interrupt is received from hyper timer 22, processor 20 continues to execute the current process, such as RE instance 16A (no branch of 44). RE instance 16A may require a clock cycle that differs from the clock cycle that controls processor 20. Instance timer 21A may be configured such that processor 20 executes RE instance 16A according to the separate clock cycle. Processor 20 may execute RE instance 16A according to RE application 30A and may handle exceptions and interrupts according to exception handler 32A. However, if processor 20 determines that the appropriate number of clock cycles have elapsed, e.g., the timer interrupt is received from timer 22, hyper scheduler 18 causes processor 20 to perform a context switch (yes branch of 44).

To perform a context switch, processor 20 saves the context of the current instance of the operating system, e.g., RE instance 16A context, to data storage 38 (46). The context of RE instance 16A typically includes registers 23, and processor 20 may save one or more of registers 23 to data storage 38. After saving the current instance context, hyper scheduler 18 causes processor 20 to load a saved instance context from data storage 38 to processor 20 (48). Typically, processor 20 loads registers 23 with data stored in data storage 38. Processor 20 also updates pointers, IVPR 24 and IVOR 25, to switch between exception handlers 32A, 32B in response to the context switch.

After loading the saved context and updating the pointers, processor 20 executes the new context according to the data stored in registers 23 and, thus, executes, for example, IC instance 16B. Processor 20 executes IC instance 16B according to IC application 30B and handles exceptions and interrupts according to exception handler 32B. Processor 20 may execute IC instance 16B according to timer 21B. Processor 20 may continue to execute IC instance 16B until processor 20 determines that another context switch should occur, e.g., processor 20 receives another timer interrupt from hyper timer 22.

Processor 20 may switch contexts to resume execution of RE instance 16A or any other instance of the operating system that hyper scheduler 18 may manage. Thus, hyper scheduler 18 provides router 14 with a low cost solution for executing multiple instances of the operating system without requiring a separate processor to execute each of the instances of the operating system. Moreover, hyper scheduler 18 may allow router 14 to execute disparate instances of the operating system.

Figure 4:
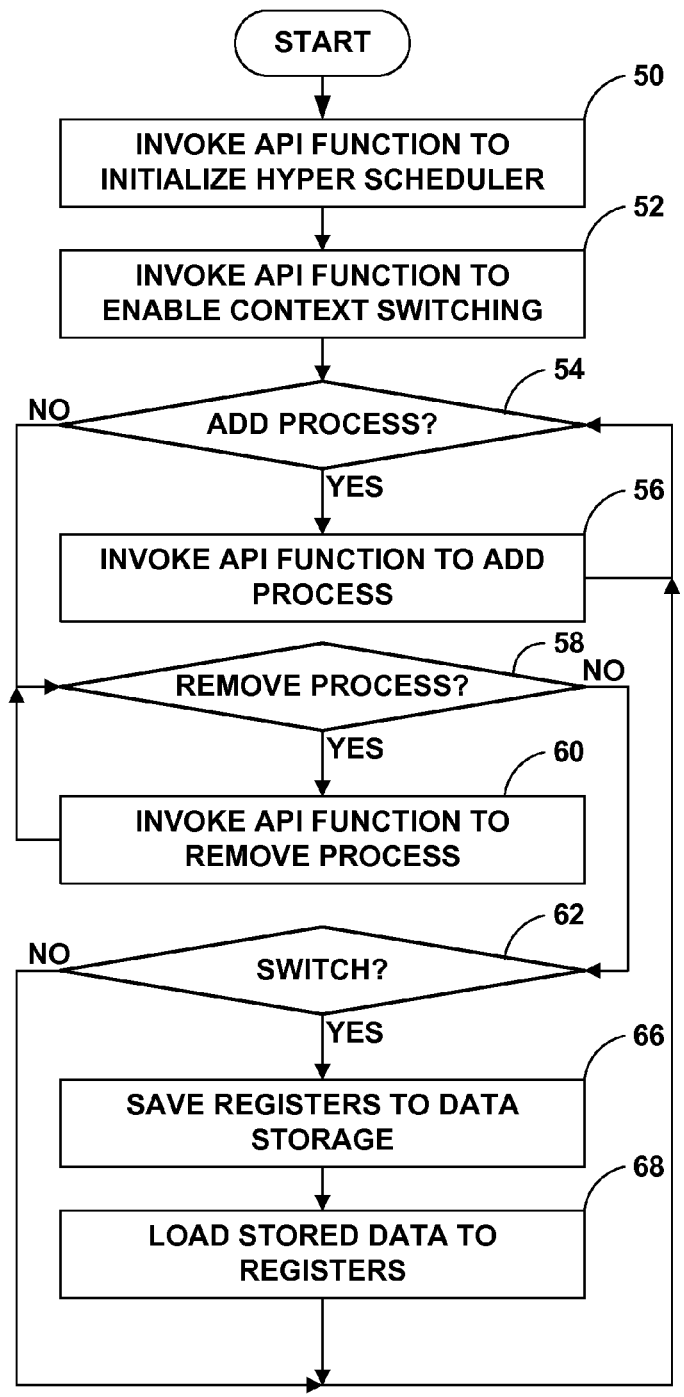
FIG. 4 is a flowchart illustrating exemplary operation of a processor executing a hyper scheduler.

FIG. 4 is a flowchart illustrating exemplary operation of a processor, such as processor 20 of FIG. 2, executing a hyper scheduler, such as hyper scheduler 18. For purposes of illustration, the flowchart of FIG. 4 will be described in reference to FIG. 2, although the method may be implemented on different devices from that illustrated in FIG. 2.

Initially, processor 20 may initialize hyper scheduler 18 via an API function call (50). For example, processor 20 may invoke the following "init" function: Void init(tickRate, ClockRateHz). The "init" function requires processor 20 to define the "tickRate" and "ClockRateHz" arguments. The "tickRate" argument defines the number of times hyper scheduler ticks per second, i.e., the number of times per second to receive the timer interrupt, and the "ClockRateHz" argument is used to program hyper timer 22 to achieve this rate. Processor 20 may initialize hyper scheduler 18 during boot up by executing a boot script that contains the "init" API function call.

After initializing hyper scheduler 18, processor 20 may also invoke another API function to enable context switching (52). An "enable" API function included within API 36 enables hyper scheduler 18 to perform context switches by causing processor 20 to decrement the decrementer at the rate set by the "init" API function call. The "enable" API function causes processor 20 to perform a context switch on the next hyper scheduler tick expiration.

Once context switching is enabled, processor 20 may add one or more processes to hyper scheduler 18 via a "process" API function call (54). Processor 20 may invoke the following "process" API function call to add processes (56): Process (EntryFunc entry, Int32U arg0, Int32U arg1, void *initialStackPtr, Int32U ticksPerSlice, char *name). In invoking the "process" API function call, processor 20 may define one or more of the "entry," "arg0," "arg1," "initialStackPtr,"ticksPerSlice," and "name" arguments. The "process" API function instantiates a new process that hyper scheduler 18 context switches according to the defined arguments.

For example, processor 20 may add a routing engine process, i.e., RE instance 16A, by invoking the "process" function as follows: HyperScheduler::Process *reprocess=new HyperScheduler::Process(pEntry, sysFlags, 0, RAM_LOW_ADRS, 2, 0). Here, processor 20 invokes the "process" function to create a new "reProcess" variable that begins executions of the pEntry function with arguments arg0 and arg1. Further, processor 20, in invoking the "process" API function, sets the "initialStackPtr," "ticksPerSlice," and "name" arguments within hyper scheduler 18 to "RAM_LOW_ADRS," "2," and "0," respectively. In this manner, processes may be flexibly configured by assigning the memory in which a given process is to be run as well as the time per slice to be allocated to the process.

Processor 20 may continue to add processes in this manner, or processor 20 may not add any more processes and may continue to concurrently execute the previously added processes. Processor 20 may also remove one or more processes assigned to hyper scheduler 18 (58), and may invoke a "delete" API function call (60). For example, processor 20 may remove the "reProcess" by invoking the "delete" API function as follows: delete reProcess. Processor 20 may continue to delete processes in this manner and, once finished removing processes, processor 20 may continue to concurrently execute the remaining processes.

During this initial configuration, processor 20 may receive one or more timer interrupts, as described above, and processor 20 may execute hyper scheduler 18 after receiving an interrupt from hyper timer 22. Hyper scheduler 18 may decrement the decrementer (i.e., hyper timer 22) according to the arguments set by the "init" API function call. If hyper scheduler 18 determines that the decrementer reached zero, hyper scheduler 18 may perform a context switch (62). Once unlocked, hyper scheduler 18 may cause processor 20 to store the content of registers 23 to data storage 38 (66). Processor 20 also updates pointers, IVPR 24 and IVOR 25, to switch between respective exception handlers 32A, 32B of instances 16 in response to the context switch.

Hyper scheduler 18 stores registers 23 so that hyper scheduler 18 may restore the contents of registers 23 and processor 20 may resume operation of the stored process, e.g., RE instance 16A, upon the next context switch. Registers 23 may indicate, for example, the next instruction processor 20 executes, outstanding interrupts and exceptions the process may handle, and other information pertinent to resuming operation of the process. Once stored, hyper scheduler 18 continues to switch contexts by loading data corresponding to another process, e.g., IC instance 16B, stored in data storage 38 to the appropriate registers 23 (68) and updating pointers to the exception handlers.

Hyper scheduler 18 may then reset the decrementer to mark the time until the next context switch, and hyper scheduler 18 may not reset the decrementer to the same value as before, but to a value based on the "ticksPerSlice" argument set when the process was added. Processor 20 may then add further processes or remove processes, as well as, continue performing context switches. To suspend hyper scheduler 18, processor 20 may invoke a "lock" API function to disable context switching. To resume hyper scheduler 18, processor 20 may invoke the "unlock" API function to enable context switching.

While hyper scheduler 18 is described as a set of instructions that cause processor 20 to perform a context switch, hyper scheduler 18 may also comprise a separate control unit to facilitate context switching or may comprise programmable logic to perform context switches. In this embodiment, hyper scheduler 18 may not comprise an API, and, instead, may communicate directly with the processor to achieve efficient concurrent execution of two or more processes. Furthermore, while described in reference to a network device, such as router 14, the principles of the invention should not be limited as such and should include any device that comprises a single processor to concurrently execute two or more instances of an operating system. In this manner, a device may employ a single processor to execute two or more disparate instances of an operating system. Thus, the device may provide a low cost alternative to converging the disparate processes or utilizing multiple processor to execute the disparate processes.

Various embodiments of the invention have been described. These and other embodiments are within the scope of the following claims.

The invention claimed is:

1. A router comprising:
   a processor;
   a memory addressable by a plurality of addresses;
   a routing engine software instance executing on the processor;
   an interface controller software instance concurrently executing on the processor with the routing engine software instance;
   a first set of exception handlers stored within the memory, wherein the first set of exception handlers processes all interrupts for the respective routing engine software instance executing on the processor;
   a second set of exception handlers stored within the memory, wherein the second set of exception handlers processes all interrupts for the interface controller software instance executing on the processor;
   a hyper scheduler that switches between the first set of exception handlers and the second set of exception handlers when the processor executes the routing engine software instance and the interface controller software instance, wherein the hyper scheduler executes independent from both the routing engine software instance and the interface controller software instance,
   wherein the processor includes a first instance timer that is configurable to a first rate for the routing engine software instance by which the routing engine software instance executes and a second instance timer configurable to a second rate different from the first rate for the interface controller software instance by which the interface controller software instance executes, and
   wherein the hyper scheduler concurrently executes the routing engine software instance and the interface controller software instance on the processor at the corresponding first and second rates defined by the respective first and second instance timers.

2. The router of claim 1,
   wherein the routing engine software interface executes on a first instance of an operating system, and
   wherein the interface controller software interface executes on a second instance of the operating system.

3. The router of claim 2, wherein the processor maintains pointers to each of the exception handlers, wherein the pointers are updated to switch between the sets of exception handlers in response to a context switch.

4. The router of claim 3,
   wherein the processor includes one or more registers, and
   wherein the hyper scheduler updates the one or more registers to switch between the different sets of exception handlers during the context switch.

5. The router of claim 4, wherein the pointers comprise an interrupt vector prefix register and an interrupt vector offset register.

6. The router of claim 3,
   wherein the memory couples to the processor,
   wherein the hyper scheduler stores state information associated with the first instance of the operating system from the processor to the memory, and loads state information associated with the second instance of the operating system from the memory to the processor.

7. The router of claim 6, wherein the hyper scheduler loads and stores the state information by loading and storing one or more of a stack pointer, a machine state register, an interrupt vector prefix register, an interrupt vector offset register, a program counter register, a process identification register, a interrupt mask register, a timer register, and a general register.

8. The router of claim 2, wherein the processor concurrently executes the first instance of the operating system and the second instance of the operating system for a configurable time, wherein the configurable time differs for each of the first instance of the operating system and the second instance of the operating system.

9. The router of claim 1, wherein the hyper scheduler performs the context switch in response to receiving a timer interrupt.

10. The router of claim 1, wherein the hyper scheduler performs the context switch after receiving an application programmer's interface (API) function that enables a context switch and before receiving an API function that disables the context switch.

11. The router of claim 1, wherein the hyper scheduler further causes the processor to execute a context switch routine.

12. The router of claim 11, wherein the processor further invokes a first API function that initializes the hyper scheduler and invokes a second API function that causes the hyper scheduler to add one of the routing engine software instance and the interface controller software instance to the context switch routine.

13. The router of claim 12, wherein the processor invokes the second API function to define a configurable time to execute the added one of the routing engine software instance and the interface controller software instance.

14. The router of claim 13, wherein the processor initializes the hyper scheduler during start-up of the router prior to loading either the routing engine and interface controller software instances.

15. The router of claim 1,
   wherein the routing engine software instance comprises a first multitask, interrupt driven, fully preemptive software instance, and
   wherein the interface controller software instance comprises a second single task, run-to-completion software instance.

* * * * *